US012753367B2

(12) United States Patent
Eyassu et al.

(10) Patent No.: US 12,753,367 B2
(45) Date of Patent: Oct. 6, 2026

(54) DRY-WASH AEROSPACE CLEANING COMPOSITION

(71) Applicant: Henkel AG & Co. KGaA, Duesseldorf (DE)

(72) Inventors: Tsehaye Negash Eyassu, Sterling Heights, MI (US); Andrew M. Dahl, Wixom, MI (US); Bashir M. Ahmed, Rochester, MI (US); Omar L. Abu-Shanab, Rochester Hills, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 583 days.

(21) Appl. No.: 18/065,238

(22) Filed: Dec. 13, 2022

(65) Prior Publication Data

US 2023/0212479 A1 Jul. 6, 2023

Related U.S. Application Data

(63) Continuation of application No. PCT/US2021/038638, filed on Jun. 23, 2021.

(60) Provisional application No. 63/046,827, filed on Jul. 1, 2020.

(51) Int. Cl.

| | |
|---|---|
| ***C11D 3/18*** | (2006.01) |
| ***B08B 3/04*** | (2006.01) |
| ***C11D 1/12*** | (2006.01) |
| ***C11D 1/78*** | (2006.01) |
| ***C11D 3/12*** | (2006.01) |
| ***C11D 3/20*** | (2006.01) |
| ***C11D 3/22*** | (2006.01) |
| ***C11D 3/30*** | (2006.01) |
| ***C11D 3/36*** | (2006.01) |
| ***C11D 3/43*** | (2006.01) |
| ***C11D 17/00*** | (2006.01) |
| ***C11D 17/04*** | (2006.01) |

(52) U.S. Cl.

CPC ............ *C11D 3/2075* (2013.01); *C11D 1/123* (2013.01); *C11D 1/78* (2013.01); *C11D 3/128* (2013.01); *C11D 3/222* (2013.01); *C11D 3/30* (2013.01); *C11D 17/047* (2013.01)

(58) Field of Classification Search

None

See application file for complete search history.

(56) References Cited

U.S. PATENT DOCUMENTS

| | | | | |
|---|---|---|---|---|
| 3,071,479 A | | 1/1963 | Fulenwider, Jr. | |
| 3,576,779 A | * | 4/1971 | Holdstock et al. .. | C08G 77/388 106/11 |
| 4,755,223 A | | 7/1988 | Castaldo | |
| 5,397,384 A | * | 3/1995 | Wisniewski ............. | C09G 1/04 106/11 |
| 5,782,962 A | * | 7/1998 | Burke ...................... | C09G 1/10 106/11 |
| 6,551,974 B1 | | 4/2003 | Conrad et al. | |
| 7,067,573 B1 | | 6/2006 | Serobian | |
| 7,374,592 B2 | | 5/2008 | Hasinovic et al. | |
| 2008/0161220 A1 | | 7/2008 | Schultz et al. | |
| 2013/0109794 A1 | | 5/2013 | Polzin et al. | |

FOREIGN PATENT DOCUMENTS

| | | |
|---|---|---|
| CN | 1980985 A | 6/2007 |
| CN | 104974669 A | 10/2015 |
| CN | 106833933 A | 6/2017 |

OTHER PUBLICATIONS

CN108912926 (Year: 2018).*

International Search Report for PCT/US2021/038638 mailed Oct. 15, 2021.

Supplementary EP Search Report for EP 21832833 mailed May 28, 2024.

* cited by examiner

*Primary Examiner* — Lorna M Douyon

(74) *Attorney, Agent, or Firm* — Mary K. Cameron

(57) ABSTRACT

Disclosed is a no-rinse aerospace cleaning composition useful in cleaning painted and unpainted metal, as well as polymeric surfaces found in aircraft, the composition comprising an oil-in-water emulsion containing water, organic solvent, an aqueous emulsion of wax-free glossing agent, solid particles, polyalkylsiloxane oil, surfactant, emulsifier, thickener, corrosion inhibitor, and pH adjuster; methods of making and using the composition are also provided.

16 Claims, 2 Drawing Sheets

DRY-WASH AEROSPACE CLEANING COMPOSITION

TECHNICAL FIELD

This disclosure relates generally to dry-wash aerospace cleaning compositions useful in cleaning and polishing painted and unpainted aerospace metal and non-metal surfaces, desirably without rinsing before or after application. The disclosure is also directed to methods of making such compositions, methods of cleaning and polishing using the composition and to substrates treated with the cleaning composition.

BACKGROUND OF THE DISCLOSURE

This section provides background information which is not necessarily prior art to the inventive concepts associated with the present disclosure.

During their manufacture, use and repair, metal and non-metal aerospace surfaces, e.g. aircraft bodies, can acquire unwanted materials on their surfaces such as organic and inorganic soils, pollutants, tar, grease and oils and the like ("dirt"). The build-up of such materials can be unsightly and deleterious, particularly to moving parts, and it is therefore desirable to regularly remove such unwanted materials from the bodies and parts.

Currently there are many water rinseable cleaners and only a few dry-wash cleaners available for use in aerospace applications, both of which have drawbacks. Water rinseable cleaners have the drawback of requiring both a water source for rinsing and a disposal means for rinse water containing dirt and residual cleaner. Also, cleaners that require rinsing may spread or rinse-off onto unintended surfaces of the aircraft body, which may damage them. Many of the presently available compositions contain aromatic hydrocarbon solvents which possess unpleasant odor and raise concerns with respect to environmental impact, e.g. such solvents may be classified as volatile organic compounds or requiring special handling. Some of the compositions while effective, introduce unacceptable fire hazard risk due to low flash point solvents utilized. In addition, some compositions are not stable when stored at a room temperature and require extra mixing before and during application or do not readily re-mix after storage leading to waste and inconsistent performance. Prior dry wash cleaners have additional drawbacks, e.g. they are only safe and effective on a limited number of surface types. Dry wash cleaners may also cause crazing of some surfaces, tend to cause surface scratches during cleaning, and leave residues, e.g. dust or grit, on dry washed aerospace surfaces, which is deleterious. Thus, there is a need for a dry wash cleaner that reduces or eliminates one or more of the above-described drawbacks. There is a need in the art to provide an alternative composition having an effective cleaning performance but which further: has a low volatile organic compound (VOC) level; is non-corrosive of metal and does not craze non-metal surfaces being cleaned; can itself provide protection for the cleaned surface against corrosion and staining; and, requires no pre- or post-rinsing of the surface. The present invention addresses at least some of these drawbacks and the need for a no rinse cleaner providing stain and/or corrosion protection.

SUMMARY OF THE DISCLOSURE

An object of the invention is to provide a liquid oil-in-water emulsion cleaning composition, which can be used to clean multiple different types of aerospace surfaces, including painted and unpainted metal surfaces, acrylic surfaces, polycarbonate and other polymeric surfaces and articles having a combination of surfaces of various types, by simply applying the composition and wiping it off without post-rinsing.

Various aspects of the invention are described throughout this disclosure. According to one aspect ("Aspect 1") the present invention, provides a dry-wash cleaning composition that comprises, consists essentially of or consists of an oil-in-water emulsion containing, based on the weight of the composition:

A) water present in an amount of at least 50 wt. %;
B) isoparaffinic organic solvent desirably present in an amount of up to about 30 wt. %;
C) ultra-fine solid particles having a DM of less than 900 nanometers, preferably less than 500 nm, most preferably less than 300 nm;
D) an aqueous emulsion of wax-free glossing agent;
E) at least one surfactant, different from that found in Component D), desirably at least one anionic surfactant;
F) polydialkylsiloxane oil; and
G) water-soluble or water-miscible corrosion and stain inhibitor.

Further aspects of the invention may be summarized as follows:

Aspect 2: The dry-wash cleaning composition of Aspect 1, further comprising one or more additives selected from emulsifier, pH adjuster, thickener, anti-static agents and preservatives.

Aspect 3: The dry-wash cleaning composition of Aspect 2, wherein the emulsifier is present in an amount of 0.8 to 3 wt. %, based on the weight of the composition, and comprises at least one tall oil fatty acid.

Aspect 4: The dry-wash cleaning composition of Aspect 2 or 3, wherein the pH adjuster is present in an amount of 1-3 wt. %, based on the weight of the composition, and comprises an alkanolamine.

Aspect 5: The dry-wash cleaning composition of Aspect 2 or 3 or 4, wherein the thickener is present in an amount of about 0.1-1.0 wt. %, based on the weight of the composition, and comprises an anionic polysaccharide thickener.

Aspect 6: The dry-wash cleaning composition of any one of Aspect 1-5, wherein component C) the solid particles comprises clay having a DM of less than 300 nm.

Aspect 7: The dry-wash cleaning composition of any one of Aspect 1-6, wherein component C) the solid particles comprise aluminum silicate, present in an amount of 5-15 wt. %, based on the weight of the composition.

Aspect 8: The dry-wash cleaning composition of any one of Aspect 1-7, wherein component E) the at least one surfactant comprises at least one anionic surfactant.

Aspect 9: The dry-wash cleaning composition of any one of Aspect 1-8, wherein the at least one anionic surfactant comprises one or more hydrophobic alkyl chains and a sulfur-containing charged hydrophilic end group.

Aspect 10: The dry-wash cleaning composition of any one of Aspect 1-9, wherein the at least one anionic surfactant comprises a diester sulfosuccinate salt present in an amount of 0.1-0.3 wt. %, based on the weight of the composition.

Aspect 11: The dry-wash cleaning composition of any one of Aspect 1-10, wherein the at least one anionic surfactant comprises a di-alkyl sulfosuccinate where the di-alkyl is selected from dibutyl, diisobutyl, dihexyl, dioctyl sulfosuccinate present in an amount of at least 0.01 and up to 0.5 wt. %, based on the weight of the composition.

Aspect 12: The dry-wash cleaning composition of any one of Aspect 1-11, wherein the water-soluble or water-miscible corrosion and stain inhibitor comprises an organophosphonic acid, organophosphinic acid or a combination thereof.

Aspect 13: The dry-wash cleaning composition of any one of Aspect 1-12, wherein Component G) the water-soluble and/or water-miscible corrosion and stain inhibitor comprises an organophosphonic acid comprising a C6-C18 organic portion and is present in an amount of at least 0.01 and up to 0.5 wt. %, based on the weight of the composition.

Aspect 14: The dry-wash cleaning composition of any one of Aspect 1-13, wherein

A) the water is present in an amount of 60-90 wt. %;

B) the isoparaffinic solvent is hydrotreated and present in an amount of 5-25 wt. %;

C) the ultra-fine solid particles comprise aluminum silicate clay having a DM of less than 300 nm present in an amount of 5-15 wt. %; and the composition further comprises an alkanolamine present in an amount of 1-3 wt. %, thickener present in an amount of 0.1-1.0 wt. %, and tall oil fatty acid emulsifier present in an amount of 1-3 wt. %; each based on the weight of the composition.

Aspect 15: The dry-wash cleaning composition of any one of Aspect 1-14, wherein:

E) the at least one surfactant comprises an anionic surfactant selected from sulfosuccinate surfactants present in an amount of 0.1-0.3 wt. %;

F) the polydialkylsiloxane oil has a viscosity in a range of 100 to 1000 cSt present in an amount of 0.5-0.2 wt. %; and G) the water-soluble or water-miscible corrosion and stain inhibitor comprises a phosphonic acid present in an amount of 0.1-0.3 wt. %.

Aspect 16: A method of cleaning and glossing aircraft exteriors comprising steps of:

a) applying a composition according to of any one of Aspect 1-15, to an aircraft exterior surface or portion of thereof comprising one or more of painted surfaces, unpainted metal surfaces, and polymeric surfaces;

b) wiping or rubbing the composition on the surface thereby emulsifying or removing dirt from surfaces;

c) air drying the cleaner on the surface to produce a cleaner residue; and d) removing the cleaner residue and any dirt without water rinsing, optionally buffing the surface.

Desirably the liquid no-rinse compositions are environmentally friendly, e.g. free of alkylphenol ethoxylates (APE); formaldehyde; and aromatic solvents, such as benzene, toluene, xylene and the like. For ease of use and safety, the composition desirably has a high flash point, preferably greater than in increasing order of preference 90, 80, 70, 68, 66, 64, 62, 60, 58, 55° C., but evaporates to leave a dry or semi-dry residual useful in enhancing surface gloss when wiped off. The oil-in-water emulsion cleaning composition comprises low to no odor raw materials, e.g. organic solvent. The compositions comprise a combination of components selected to produce a dry wash cleaner that meets aerospace requirements, such as cleaner stability and cleaners providing corrosion resistance and scratch resistance to surfaces. Preferably, the composition causes no crazing of polymeric surfaces, and no paint softening. Furthermore, the composition comprises ultra-fine, low particle size solid particles, desirably less than 500 nm DM, preferably less than 300 nm DM, preferably clay, to impart very mild polishing and eliminating surface scratches.

The term "solvent" means liquid that serves as the medium to at least partially dissolve a solute, e.g. component of a composition or concentrate according to the disclosure, and may include water, organic molecules, inorganic molecules and mixtures thereof, unless otherwise defined in the description.

The term "soluble" with respect to any component means that the component acts as a "solute" which dissolves in a solvent or solvent system or composition thereby forming a liquid solution, which does not form separate phases, whether liquid or solid, e.g. a precipitate, visible to the unaided human eye.

For a variety of reasons, it is preferred that compositions and concentrates disclosed herein may be substantially free from many ingredients that may be used in compositions for similar purposes in the prior art. Specifically, it is increasingly preferred in the order given, independently for each preferably minimized ingredient listed below, that at least some embodiments of coating compositions or concentrates according to the invention contain no more than 1.0, 0.5, 0.35, 0.10, 0.08, 0.04, 0.02, 0.01, 0.001, or 0.0002 percent, more preferably said numerical values in grams per liter, more preferably in ppm, of each of the following constituents: alkylphenol ethoxylates (APE); aromatic solvents, such as benzene, toluene, xylene and the like; volatile organic compounds such as d-limonene, acetone, ethanol, 2-propanol, hexanal; colorant such as a dye or pigment; wax, both naturally occurring and synthetic; oxidizing agents such as oxygen, peroxides and peroxyacids, permanganate, perchlorate, chlorate, chlorite, hypochlorite, perborate, hexavalent chromium, sulfuric acid and sulfate, nitric acid and nitrate ions; as well as fluorine, formaldehyde, formamide, hydroxylamines, cyanides, cyanates, ammonia; rare earth metals; boron, e.g. borax, borate; strontium; and/or free halogen ions, e.g., fluoride, chloride, bromide or iodide. Also, it is increasingly preferred in the order given, independently for each preferably minimized ingredient listed above, that at least some embodiments of surfaces cleaned according to the invention, contain no more than 1.0, 0.5, 0.35, 0.10, 0.08, 0.04, 0.02, 0.01, 0.001, or 0.0002 percent, more preferably said numerical values in parts per thousand (ppt), of each of the aforestated constituents after the dry-wash cleaner has been removed according to herein described methods. In certain embodiments, the compositions of the invention are free of one or more of the above listed minimized ingredients.

The simple term "metal" or "metallic' will be understood by those of skill in the art to mean a material, whether it be an article or a surface, that is made up of atoms of metal elements, e.g. copper or iron, the metal elements present in amounts of at least, with increasing preference in the order given, 55, 65, 75, 85, or 95 atomic percent, for example the simple term "copper" includes pure copper and those of its alloys that contain at least, with increasing preference in the order given, 55, 65, 75, 85, or 95 atomic percent of copper atoms. A bare metallic surface will be understood to mean a metallic surface in the absence of a coating layer, other than oxides of metal elements derived from the metallic surface through aging in air and/or water.

Other than in the operating examples, or where otherwise indicated, all numbers expressing quantities of ingredients, reaction conditions, or defining ingredient parameters used herein are to be understood as modified in all instances by the term "about". Throughout the description, unless expressly stated to the contrary: percent, "parts of", and ratio values are by weight or mass; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) between one or more newly added constituents and one or more constituents already present in the composition when the other constituents are added; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise, such counterions may be freely selected, except for avoiding counterions that act adversely to an object of the invention; molecular weight (MW) is weight average molecular weight unless otherwise specified; the word "mole" means "gram mole", and the word itself and all of its grammatical variations may be used for any chemical species defined by all of the types and numbers of atoms present in it, irrespective of whether the species is ionic, neutral, unstable, hypothetical or in fact a stable neutral substance with well-defined molecules.

This section provides a general summary of the disclosure and is not a comprehensive disclosure of its full scope or all features, aspects or objectives. These and other features and advantages of this disclosure will become more apparent to those skilled in the art from the detailed description of a preferred embodiment. The drawings that accompany the detailed description are described below.

DETAILED DESCRIPTION OF A PREFERRED EMBODIMENT

Figure 1:
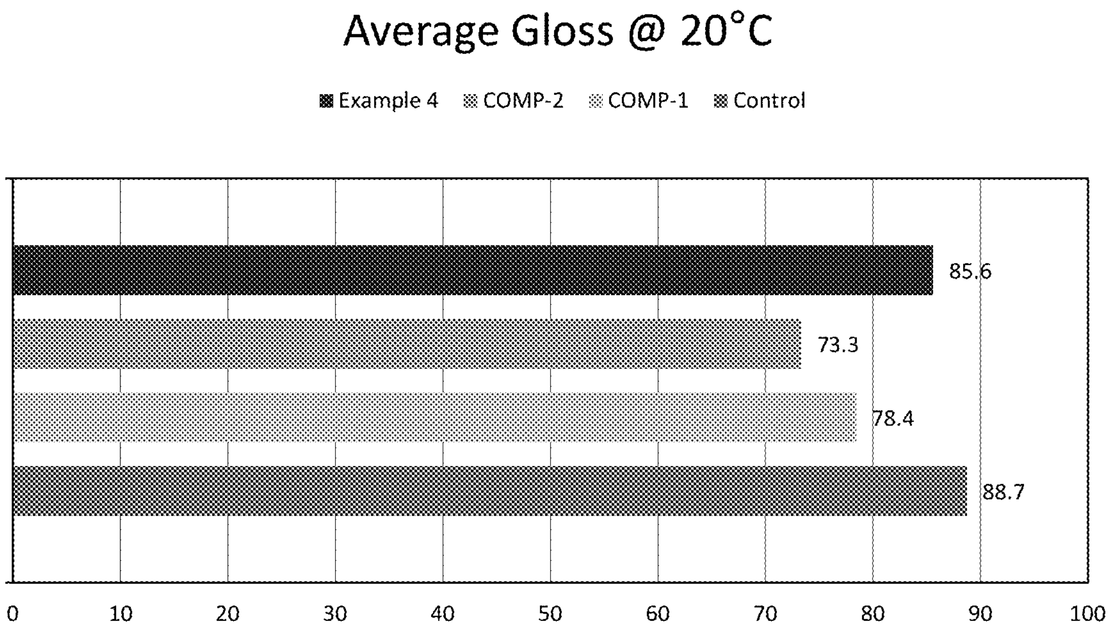
FIG. 1 is a graph comparing average gloss of freshly painted high gloss painted surfaces, which after painting were cleaned with an embodiment of the invention, or cleaned with comparative materials or were untreated; and gloss measured.

The present invention is directed to an oil-in-water emulsion cleaner composition for aircraft that can be applied and wiped off without the need for post-cleaning rinsing, while containing reduced amounts of undesirable ingredients such as aromatic hydrocarbon solvents, volatile organic compounds, low flash point solvents, compared to other no-rinse cleaners used in aerospace, preferably no amounts of these ingredients. The invention is further directed to methods of making such compositions, methods of cleaning and polishing using the composition and to substrates treated with the cleaning composition. The above-mentioned characteristics are provided in a new dry wash composition along with key surface finishing properties such has a clean, glossy surface provided with corrosion and stain resistance. The composition may be used on all painted and unpainted surfaces aerospace surfaces without crazing polymeric surfaces or softening paint. The cleaner emulsion composition is also referred to herein as a "dry-wash" cleaner.

In accordance with a first aspect of the invention, there is provided an oil-in-water emulsion cleaning composition for cleaning aerospace surfaces, e.g. metal and non-metal surfaces of aircraft bodies, useful as a dry-wash cleaner requiring no water rinsing of the surfaces before or after application of the oil-in-water emulsion cleaner.

The dry-wash cleaning composition comprises, consists essentially of or consists of an oil-in-water emulsion cleaning composition as defined in the appended claims, said composition may comprise, based on the weight of the composition:

A) water present in an amount of at least 50 wt. %;

B) isoparaffinic organic solvent desirably present in an amount of about 5-25 wt. %;

C) ultra-fine solid particles having a DM of less than 500 nanometers (<0.5 micron), desirably less than 300 nm;

D) an aqueous emulsion of wax-free glossing agent;

E) at least one surfactant, different from that found in Component D), desirably at least one anionic surfactant;

F) polydialkylsiloxane oil, different from Component D); and

G) water-soluble or water-miscible corrosion and stain inhibitor.

The composition may further comprise additives including, but not limited to emulsifier, pH adjuster; thickener, anti-static agents, preservatives and the like.

Component A) of water can be tap water, provided mineral content or other contaminants do not interfere with objects of the invention, and desirably may be filtered, deionized or distilled water. Component A) is present in an amount of at least in increasing order of preference 50, 55 or 60 wt. %, desirably about 60-90 wt. %, or 65-75 wt. %, based on the weight of the composition. Amounts of water greater than 90 wt. % may be included in the oil-in-water emulsion cleaning composition provided that adequate cleaning performance and stability are achieved. In one embodiment, water is present in an amount of, in increasing order of preference, at least 61, 62, 63, 64, 65, 66 or 67 wt. % and in increasing order of preference, up to 87, 85, 83, 81, 79, 77, 75, 73 or 70 wt. %.

Component B) isoparaffinic solvent is a liquid mixture of branched chain hydrocarbons. The isoparaffinic solvent may comprise a mixture of C11-C16 branched alkanes and C11-C16 cyclic alkanes, in which case the majority (>50%) is branched and desirably the ratio of branched to cyclic alkanes is at least about 80:20 or greater, e.g. 85:15 or 90:10 or 95:5. In another embodiment, the isoparaffinic solvent may comprise a mixture of C11-C14, C11-C13 or C11-C12 branched alkanes. Suitable isoparaffinic solvents may be synthetic solvents with a flash point greater than in increasing order of preference at least 50, 55, 60, 61, 62, 63, 64, 65, 66, 67, 70, 72, 74, 76, 78 or 80° C. or more. Component B) desirably has an evaporation rate and boiling range suitable for use in a dry-wash cleaner. In one embodiment the boiling point ranges from 175 or 185 up to about 200 or 218° C. The isoparaffinic hydrocarbon solvent is useful in the cleaner to improve solvency and disintegration of heavy-duty greases and oils. The isoparaffinic hydrocarbon solvent may be hydrotreated. Desirably, the isoparaffinic hydrocarbon solvent may have aromatic content of less than 0.05 wt. % preferably less than 0.01 wt. %. Low aromatic content eliminates unpleasant odor and makes the working environment comfortable compared to traditional solvents, such as kerosene. Desirably, Component B) has low odor, is non-polar and useful in imparting the characteristics of low surface tension and the high oxidation stability to compositions of the invention. In one embodiment, Component B) has a flash point of greater than 64° C. and is present in an amount of about 5-25 wt. %. Component B) may be present in an amount of at least in increasing order of preference 2, 4, 5, 6, 7, 8, 9, 10, 11 or 12 wt. %, and in increasing order of preference, as great as 30, 28, 26, 24, 22, 20, 18, 16 or 14 wt. % based on the weight of the composition.

Component C) comprises ultra-fine solid particles having a DM of less than 500 nanometers (<0.5 micron), desirably less than 300 nm. Examples of solid particles include chalk; clays, such as feldspar; kaolin; montmorillonites, e.g. smectite and bentonite; and/or illite; silicas, such as silicon dioxide, and the like materials insoluble in the oil-in-water emulsion cleaning composition. The solid particles may be calcined. Grain morphology of the solid particles may be amorphous, rounded, irregular, angular, elongated, flaky, e.g. platelets or stacks; or combinations thereof. The particles may have an ultra-fine particle size DM not greater than 600, 500, 400, or 350 nm and preferably less than 300, 250, 235 or 200 or less and may be present in an amount of 5-10 wt. %. Grain size described herein refers to the dimension of greatest length for respective particle shapes; DM being the mean particle size. Desirably Component C) may comprise clay that comprises aluminum silicates, in particular the solid particles may comprise kaolin clay having particle size of less than 300 nm. In one embodiment, the particles comprise aluminum silicate, present in an amount of 5-15 wt. %. The particles are dispersible in both aqueous and non-aqueous systems. Component C) may be present in an amount of at least in increasing order of preference 1, 2, 3, 4, 5, 6, 7, 8, 9, 10, 11 or 12 wt. %, and in increasing order of preference, as great as 20, 18, 16, 15, 14, 13 wt. % based on the weight of the composition.

Component D) comprises an aqueous emulsion of wax-free, liquid organic glossing agent different from Components A)-C). Wax will be understood by those of skill in the art to mean a diverse class of organic compounds that are lipophilic, malleable solids near ambient temperatures, including higher alkanes and lipids, and may be synthetic or naturally occurring. Component D)'s organic glossing agent is a liquid at ambient temperature, is different from, and preferably free of wax. More specifically, the aqueous emulsion may contain at least in increasing order of preference 20, 21, 22, 23, 24, 25, 26, 27, 28, 29, or 30% w/w non-volatile content and in increasing order of preference up to 50, 48, 46, 44, 42, 40, 38, 36. 34 or 32% w/w non-volatile content. Component D) may be an opaque (i.e. milky) macro-emulsion with particle sizes from 100 nm to several microns DM. In one embodiment, Component D) may comprise an aqueous emulsion of liquid polymer. Component D) may be present in an amount of 2-5 wt. %, desirably 2.5-4 wt. %. The liquid polymer may comprise one or more organosilicon polymers with the general structure —[Si($R_2$)—O]— where the R groups are each independently an organic functional group, such as alkyl, phenyl or vinyl, preferably alkyl. In one embodiment, the organic glossing agent comprises polydialkylsiloxane, where the alkyl each alkyl group may independently be a C1 to C8, preferably at least one of the R groups being a methyl group. Component D) may be present in an amount sufficient to provide gloss and water repellency with minimum smear to painted and non-painted metals and non-metals cleaned using the oil-in-water emulsion cleaning composition. Generally, the aqueous emulsion of wax-free glossing agent is present in an amount of at least in increasing order of preference 1.0, 1.1, 1.2, 1.3, 1.4, 1.5, 1.6, 1.7, 1.8, 1.9, 2.0, 2.2, 2.4 or 2.6 wt. %, and in increasing order of preference, as great as 7.0, 6.5, 6.0, 5.5, 5.0, 4.5, 4.0, 3.5, 3.0, 2.8 wt. % based on the weight of the composition. Preferably, Component D) is free of alkylphenol ethoxylate (APE) surfactant.

Component E) comprises surfactant, different from Components A)-D), desirably an anionic surfactant having wetting agent characteristics, e.g. reducing surface tension and beading on surfaces, present in an amount sufficient to lower surface tension of the oil-in-water emulsion cleaning composition increasing its capability to wet metal and non-metal surfaces. The surfactant may also increase the oil-in-water emulsion cleaning composition dispersing and emulsifying properties for organic and inorganic soils. Suitable anionic surfactants may comprise one or more hydrophobic alkyl chains and a sulfur-containing, e.g. sulfate or sulfonate, charged hydrophilic end group together with sodium, potassium, or ammonium counterions, by way of non-limiting example sodium dodecylsulfonate, sodium dodecylbenzenesulfonate and sodium dialkylsulfosuccinate and the like. In one embodiment, the anionic surfactant may be a diester sulfosuccinate salt present in an amount of 0.1-0.3 wt. %, more preferably 0.15-0.25 wt. %. Desirably, Component E may be a di-alkyl sulfosuccinate where the di-alkyl may be selected from dibutyl, diisobutyl, dihexyl, dioctyl sulfosuccinate. Preferably the surfactant is free of alkylphenol ethoxylates (APE). Component E) may be present in an amount of at least in increasing order of preference 0.01, 0.05, 0.10, 0.12, 0.14, 0.15, 0.16, 0.17, 0.18, 0.19, 0.20 wt. %, and in increasing order of preference, as great as 0.5, 0.4, 0.30, 0.28, 0.26, 0.24, 0.22 or 0.21 wt. % based on the weight of the composition.

Component F) comprises or consists of polydialkylsiloxane oil, different from Components A)-E). Desirably the oil may be a polydialkylsiloxane comprised of long chain polymers made up of multiple $(CH_3)_n$SiO units. Component F) is useful in a protecting substrate surfaces, de-soaping and prevent foaming during application cleaning and removal of the oil-in-water emulsion cleaning composition. Preferably the polydialkylsiloxane oil is free of aromatic functional groups and present in an amount of 0.5-2.0 wt. %, preferably 0.5-1.5 wt. %. As the chain length and molecular weight increases, the viscosity increases. Suitable viscosities for use in the invention may be 50-1000 cSt, desirably viscosity ranges from 100-500 cSt. In one embodiment, Component F) may be selected from polydimethylsiloxane oils having non-functionalized end groups, e.g. $OSi(CH_3)_3$. In another embodiment Component F) is characterized by having a viscosity of 100 cSt and a flash point, open cup, of greater than 326° C. Component F) may be present in an amount of at least in increasing order of preference 0.4, 0.5, 0.6, 0.7, 0.8, 0.9, 1.0, 1.1, 1.2, 1.3 or 1.4 and in increasing order of preference, as great as 2.5, 2.3, 2.1, 2.0, 1.9, 1.8, 1.7, 1.6 or 1.5 wt. % based on the weight of the composition.

Component G) comprises water-soluble and/or water-miscible corrosion and stain inhibitor, different from Components A)-F), desirably an organo-phosphorus containing material. Any corrosion and stain inhibitor useful on aluminum surfaces may be used provided that it does not interfere with objects of the invention, such as staining, stability or cleaning performance of the oil-in-water emulsion cleaning composition. Component G) should be corrosion and/or stain protective of, or at least inert to painted substrates, non-aluminum metals and non-metal portions of the aircraft body. Component G) may be selected from organophosphonic acid, organophosphinic acid or materials derived therefrom. In one embodiment, Component G) comprises 0.1-0.3 wt. % organophosphonic acid which is a water miscible corrosion and stain inhibitor. Component G) may be an organophosphonic acid comprising a C6-C18 organic portion. In one embodiment, Component G) may be selected from octadecylphosphonic acid, n-octylphosphonic acid, poly(vinylphosphonic acid). Component G) may be present in an amount of at least in increasing order of preference 0.01, 0.05, 0.10, 0.12, 0.14, 0.15, 0.16, 0.17, 0.18, 0.19, 0.20 wt. %, and in increasing order of preference, as great as 0.5, 0.4, 0.30, 0.28, 0.26, 0.24, 0.22 or 0.21 wt. % based on the weight of the composition.

As disclosed above, oil-in-water emulsion cleaning composition may further comprise additives including, but not limited to emulsifier, pH adjuster; thickener, anti-static agents, preservatives and the like.

At least one emulsifier may desirably be present in the oil-in-water emulsion cleaning composition. Suitable emulsifiers impart oil-in-water emulsification and cleaning and may be natural or synthetic products. Generally, the emulsifiers may include saturated or unsaturated, linear or branched, C12-C22 carboxylic acid, more particularly C14-C20, most particularly C16-C18. In one embodiment, the emulsifier comprises natural tall oil fatty acids in amount of 2 wt. %. Typical tall oil provides a mixture of C16-C20 fatty acids, 80-90 wt. % being saturated and unsaturated C18 fatty acid. In one embodiment, the emulsifier is selected from stearic acid, oleic acid and combinations thereof, preferably oleic acid. Desirably, the at least one emulsifier is present in an amount of at least in increasing order of preference 0.8, 0.9, 1.0, 1.1, 1.2, 1.3, 1.4, 1.5, 1.6, 1.7 or 1.8 wt. %, and in increasing order of preference, as great as 3.5, 3.3, 3.2, 3.0, 2.9, 2.8, 2.7. 2.6, 2.5, 2.3, 2.2, 2.0, wt. % based on the weight of the composition.

Suitable pH adjuster additives which do not interfere with objects of the invention may be used such as alkanolamines, for example mono, di and/or triethanolamine, and organic acid buffers. Alkanolamine, for example triethanolamine may be used to neutralize the carboxylic acid emulsifier and hence enhance emulsion stability. Desirably, the alkanolamine is present in an amount of at least in increasing order of preference 0.8, 0.9, 1.0, 1.1, 1.2, 1.3, 1.4, 1.5, 1.6, 1.7 or 1.8 wt. %, and in increasing order of preference, as great as 3.5, 3.3, 3.2, 3.0, 2.9, 2.8, 2.7. 2.6, 2.5, 2.3, 2.2, 2.0, wt. % based on the weight of the composition.

One or more thickeners may be used to stabilize the oil-in-water emulsion cleaning composition. Suitable thickeners having good shear stability and long-term pH stability, e.g. in increasing order of preference providing at least 1, 3, 6, 9 or 12 months cleaner stability to pH changes. In some embodiments, the thickener may exhibit high viscosity at low shear and lowered viscosity with increasing shear. Examples of thickeners which may be useful in oil-in-water emulsion cleaning composition include carrageenan, gum tragacanth, xanthan gum, cellulose-based thickeners such as ethyl cellulose, methyl cellulose, hydroxypropyl methyl cellulose and the like; galactomannans, such as guar gum and the like and various anionic polymers for example polyacrylic acid polymer. In one embodiment, the thickener comprises a high molecular weight, anionic polysaccharide thickener, present in an amount of about 0.1-1.0 wt. %. Desirably, thickener may be present in an amount of at least in increasing order of preference 0.01, 0.05, 0.10, 0.12, 0.14, 0.15, 0.16, 0.17, 0.18, 0.19, 0.20 wt. %, and in increasing order of preference, as great as 2.0, 1.5, 1.0, 0.9, 0.8, 0.7, 0.6, 0.5, 0.4, 0.30, 0.28, 0.26, 0.24, 0.22 or 0.21 wt. % based on the weight of the composition.

The oil-in-water emulsion cleaning composition of the present invention may be prepared by mixing of the components under sufficient shear forces to yield a homogeneous mixture. It is considered that this can be achieved without special conditions or special equipment. That said, suitable mixing devices might include: static mixing devices; magnetic stir bar apparatuses; wire whisk devices; augers; batch mixers; planetary mixers; C.W. Brabender or Banburry® style mixers; and, high shear mixers, such as blade-style blenders and rotary impellers. In one embodiment, a water phase and an oil phase may be prepared separately, each containing components soluble or miscible in its respective continuous phase. The oil phase is then combined with the water phase with mixing, and optionally further components may be added subsequent to the combining step, and further mixing yields a homogenous oil-in-water emulsion cleaning composition. An exemplary water phase contains the water component and may contain pH adjuster, thickener, aqueous emulsion of wax-free glossing agent and other components. An exemplary oil phase contains isoparaffinic solvent and may contain tall oil fatty acid, polydialkylsiloxane polymer oil, and other components. Generally, the ultra-fine solid particles may be added last, desirably in small batches to facilitate incorporation.

The cleaning composition may be applied to a surface to be cleaned by conventional application methods, which are compatible with removal of the product by rubbing in the absence of water rinsing, such as wiping with an impregnated applicator material, brushing, roll coating, doctor-blade application, spraying and the like. For example, the oil-in-water emulsion cleaning composition may be applied with a mop, a clean cloth or sprayed directly on the surface to be cleaned. Spread a thin layer over an area to be cleaned and wipe or rub the cleaner to remove dirt from surfaces. Dry the cleaner on the surface and remove cleaner residue with a dry clean cloth. The product can also be removed in a semi-dry condition and a clean cloth used to remove the residual cleaning composition and dirt along with residual. A protective film remains on the cleaned surfaces, comprising polydialkylsiloxane which provides gloss to the cleaned surfaces. Whilst such application methods can be performed at elevated temperatures, it is preferred that the cleaning compositions be applied at a temperature of less than 40° C., for example at less than 30° C. or at room temperature.

No particular intention exists to limit the metallic, non-metallic, painted or unpainted, aerospace surfaces which are to be treated with the cleaning composition: the surfaces can be those which are typically disposed on the exteriors of aircraft or may be so disposed upon assembly or repair of a given part of an aircraft. Moreover, the pre-treatment of such surfaces to remove loose dirt and particulate materials prior to the application of the cleaning composition, may be dispensed with, i.e. omitted, but pre-treatment is not necessarily precluded in the present invention and can be beneficial in some circumstances.

EXAMPLES

Test Substrates:

Unless otherwise described herein, all test panels, e.g. Al 2024 Alclad, Al 2024-T3 Clad, Al 7075 Alclad panels; anodized Al 7075 bare panels; and titanium alloy TI 6Al-4V panels, were unpainted metal panels purchased from Q-Lab corporation.

Test Methods:

Throughout the description, "AMS" refers to Aerospace Material Specifications issued by SAE International.

Flash point testing was carried out using the Pensky-Martens closed cup method.

Cleaner stability testing was carried out according to AMS 1650A, section 3.2.7.1. The sample composition was left in 6-inch test tube for 24 hours. If separation occurred, the number of inversions required to uniformly re-disperse was recorded. The number of inversions required shall not be greater than 20.

Cleaner low and high temperature stability testing was carried out according to AMS 1650A, section 3.2.8.1. A sample composition was placed in −10° C. for 2 hours, followed by 1 hour in 47° C.; the cycle was repeated three times and the sample composition aged for 16 hours. Appearance of the sample composition was then compared to a control kept at room temperature. If the test sample can be restored to original appearance by shaking or stirring then the test sample passes.

Treated Panel Test Methods

Unless otherwise described herein, sample compositions were applied to test panels, the area of application was rubbed to emulsify the dirt on the test panels, the samples had a dwell time of 60 seconds on the surface. The sample composition and emulsified and/or removed dirt were wiped off with a clean cloth without rinsing. No buffing of the surface was required to achieve a glossy surface.

Abrasion number cleaner testing was carried out according to AMS 1650A, section 3.2.9.1. Two Alclad Al 7075 panels, size 0.04×3×6 inches, were weighed after being cleaned with methyl ethyl ketone solvent. A thin layer of the sample composition was applied on one panel and covered by the second panel being laid on top of the sample composition. The two panels were rotated, relative to each other, 25 times. The panels were separated, the sample composition removed and total weight loss in milligrams was measured and recorded as the abrasion number. Furthermore, the panels were examined for any evidence of scratching. Total weight loss exceeding 5 milligrams failed.

Testing the effect of the cleaner on unpainted surfaces was carried out according to ASTM F485. Unpainted Alclad Al 7075 panels and titanium alloy TI 6Al-4V panels were used for testing. The sample composition was applied to the unpainted panels which were immediately placed in oven set at 65.5° C. for 30 minutes. To pass, panels were permitted to show neither stains nor streaking after being exposed to the sample composition.

Sandwich corrosion testing was carried out according to ASTM F1110. Three substrates were tested, namely Al 7075 Alclad panels; anodized Al 7075 bare panels; and Al 2024 Alclad per ASTM F1110. Any substrate panel that showed a corrosion rating greater than to 1 as per ASTM F1110 or worse corrosion than the ASTM F1110 dictated control of DI water, was counted as a failure.

Immersion corrosion testing was carried out according to ASTM F483. Substrate panels were weighed, immersed in cleaner samples, reweighed and weight loss was calculated. The maximum permitted weight loss to achieve a "pass" requirement for Airbus and SAE's AMS1650 is slightly different as shown in the Table 1, which shows their respective requirements (no test results are shown). Any weight loss greater than the required maximum shown in Table 1 was counted as failure.

TABLE 1

Immersion corrosion weight loss testing requirements

| Substrate | Airbus ($mg/cm^2/24$ hrs.) Required | Airbus ($mg/cm^2/24$ hrs.) Result | AMS 1650 ($mg/cm^2/24$ hrs.) Required | AMS 1650 ($mg/cm^2/24$ hrs.) Result |
|---|---|---|---|---|
| Al 2024 Alclad | 0.02 | | Not Required | |
| Al 7075 Alclad | 0.02 | | 0.3 | |
| Anodized Al 2024 Bare | 0.02 | | Not Required | |
| Polished C1020 Steel, AMS-5046 | 0.8 | | Not Required | |
| Cd Plated, 1020 steel, AMS-5046 | 0.3 | | Not Required | |

Cleaning performance was determined by applying the sample compositions to test panel surfaces according to the method described above and assessing surface gloss and haze value, measured using Elcometer 408 from Elcometer USA. Four readings were taken for each test and an average of the data from the four readings was recorded and reported. In analyzing the gloss, a higher the gloss indicated better cleaning and maintenance. In contrast, a lower haze value indicated better cleaning.

Painted Panel Preparation:

BONDERITE C-AK 6849 alkaline cleaner and BONDERITE C-IC 6MU AERO deoxidizer were obtained from Henkel Corporation. BONDERITE M-CR 1600 conversion coating that conforms to MIL-DTL-81706, class 1A was also obtained from Henkel Corporation. An epoxy primer that conforms to MIL-PRF-23377 was purchased from AkzoNobel. A polyurethane topcoat that conforms to MIL-PRF-85285 was purchased from PPG Aerospace.

Substrate panels were prepared by the procedure detailed in Table 2 and had a resulting paint thickness of 1.8 to 2.6 mils. The Al 2024 Alclad substrate was cleaned using Bonderite C-AK 6849 AERO and deoxidized using BONDERITE C-IC 6MU AERO. A conversion coating was applied by immersion method in BONDERITE M-CR 1600 AERO bath. A primer conforming to MIL-PRF-23377 was applied by spray method. After the primer was dried for 1 hour at room temperature, a polyurethane topcoat was applied as described in the Table 2.

TABLE 2

Panel painting process according to ASTM F50208
Painting Panels (ASTM F502-08)

| Alloy | Cleaning | Conversion Coating | Primer | Topcoat |
|---|---|---|---|---|
| Al 2024-T3 Clad (3 × 6 × 0.02 inches) * 20 Panels | Alkaline cleaner + Deoxidizer | MIL-DTL-81706, Class IA | MIL-PRF-23377 Epoxy primer (0.6-0.8 mil) Dry 1 hour at RT | MIL-PRF-85285 - Polyurethane 1. Apply Mist - Dry 30 min 2. Apply 3 X (0.4 to 0.6 mil) 3. Allow 1-hr dry at RT between each coat 4. Dry 4 days at RT 5. Then Bake at 180 F. for 24 hrs. |

*RT: room temperature, approx. 21-26° C.

Painted Panel Testing

Test procedure for effect of cleaner on a painted surfaces was carried out according to ASTM F502, which requires, for passing, that the cleaner shall not decrease the hardness of the paint film by more than two pencil hardness levels and shall not produce any stain or blistering on the paint film.

Test Formulations

Cleaning compositions were made containing components as listed in the table below:

TABLE 3

Formulations of Examples 1-5.

| Material WT % | Ex. 1 | Ex. 2 | Ex. 3 | Ex. 4 | Ex. 5 |
|---|---|---|---|---|---|
| Water, DI | 90.3 | 63.6 | 67.4 | 69.05 | 69.05 |
| pH adjuster | | 1.3 | 1.8 | 1.8 | 1.8 |
| Thickener | 0.5 | 0.4 | 0.4 | 0.3 | 0.3 |
| Aqueous emulsion of wax-free glossing agent | 3 | 4 | 3.5 | 3.5 | 3.5 |
| Liquid isoparaffinic solvent- Naphtha (petroleum), hydrotreated heavy | 3 | 15 | 15 | 15 | 15 |
| Tall oil fatty acid | | 2 | 2 | 2 | 2 |
| Polydialkylsiloxane oil polymer (100 cStokes) | | 2 | 1 | 1 | 1 |
| Amine-based corrosion inhibitor | | 0.7 | 0.5 | | |
| Clay DM < 300 nm | | 10 | 8 | 7 | |
| Clay DM avg 900 nm | | | | | 7 |
| Phosphonic acid stain and corrosion inhibitor | | | 0.2 | 0.15 | 0.15 |
| Anionic surfactant | | | 0.2 | 0.2 | 0.2 |
| Non-ionic surfactant, Polysorbate 80 | 2 | | | | |
| Arylalkoxy silane film hardener | 1 | | | | |
| Aluminum silicate | 0.2 | | | | |
| Polydialkylsiloxane polymer (1000 cStokes) | | 1 | | | |
| Total | 100 | 100 | 100 | 100 | 100 |

Example 1

In Example 1, an oil-in-water emulsion cleaning composition was prepared in a clean stainless-steel beaker 316 as follows: The container was charged with deionized water. A low foaming thickener was added and mixed until a viscous, uniform, and transparent mixture was obtained. Next, an aqueous emulsion of wax-free glossing agent was added to the mixture to provide gloss and water repellence at minimum smear. After the mixture was uniform, a low odor and high flash point isoparaffinic solvent was added to impart cleaning for organic soils. The solvent was selected to have a drying rate suitable for use in dry wash application. Non-ionic surfactant was added and the mixture blended to provide oil in water emulsion and stability according to AMS 1650A, section 3.2.7.1. Arylalkoxy silane film hardener and aluminum silicate were added and mixed until a uniform oil-in-water emulsion cleaning composition was obtained.

The Example 1 composition was used to clean test panels of Al 2024 Alclad: unpainted panels and panels painted per Table 2's process. Example 1 showed good cleaning for low soils surfaces, but required multiple applications to remove heavy soils, based on gloss and haze values. In addition, there was significant discoloration of Al 2024 Alclad during cleaning. The present composition did not protect unpainted surfaces from stain and provided minor corrosion protection when tested as per ASTM F485 and ASTM F1110 respectively.

Example 2

In Example 2 formulation, the oil-in-water emulsion cleaning composition was prepared by mixing an oil phase into the water phase. Water Phase Component: In the main stainless steel 316 container, a water phase was prepared by charging water and followed by pH adjuster. Once the solution was miscible, thickener was added in small batches and mixed until viscous, smooth, and transparent mixture obtained. To complete the water phase part, an aqueous emulsion of wax-free glossing agent was added and mixed until it was completely dispersed. Oil Phase Component: In a separate container of stainless steel 316, the oil phase was prepared by mixing isoparaffinic solvent, tall oil fatty acid, polydialkylsiloxane polymer (100 cSt), and polydialkylsiloxane polymer (1000 cSt).

The oil phase was added to the water phase and mixed until uniformly dispersed in the water phase. Next, amine-based corrosion inhibitor was added and mixed until completely dissolved. At the end, the ultra-fine clay DM<300 nm was added in small portions and mixed until completely dissolved and a uniform emulsion obtained.

The present composition showed good cleaning with excellent gloss due to an increase in isoparaffinic solvent concentration and of the aqueous emulsion of wax-free glossing agent, respectively. An aluminum silicate clay with ultrafine particle size not greater than 300 nm added providing very mild polishing properties.

The oil-in-water emulsion cleaning composition was stable at low and high temperature cycle testing according to according to AMS 1650A, section 3.2.8.1. However, it caused higher surface tension during application. The addition of the amine-based corrosion inhibitor resulted in some stain and discoloration of Al 7075 Alclad alloy when tested according to ASTM F485. An abrasion number for unpainted surfaces of Al 7075 Alclad passed, but was close to 4 mg.

Example 3

The Example 3 composition was prepared according to the procedure of Example 2, but omitting the 1000 cSt siloxane polymer. After addition of the clay, once a uniform emulsion was obtained, phosphonic acid corrosion inhibitor and the anionic surfactant were added and mixed until uniformly dispersed.

The addition of phosphonic acid corrosion inhibitor improved corrosion and stain protection when tested according to ASTM F458. An increase in the amount of pH adjuster also assisted in stain and corrosion inhibition of aluminum alloys when tested for sandwich corrosion (ASTM F1110) and immersion corrosion (ASTM F483).

The addition of anionic surfactant at low concentration improved wetting properties and compatibility of the oil-in-water emulsion cleaning composition for different substrates, namely metal, painted and unpainted, polymeric (e.g. plastic) acrylic and polycarbonate. The Example 3 composition described herein exhibited improved wetting (low beading of liquid cleaner on surfaces), stain and abrasion performance.

Example 4

The Example 4 oil-in-water emulsion cleaning composition was prepared as described in Example 3, except the amine-based corrosion inhibitor was omitted. The Example 4 formulation exhibited a stable emulsion, and no separation was observed through low and high temperature cycle testing according to according to AMS 1650A, section 3.2.8.1.

During application, the Example 4 composition showed uniform spreading of the product on test substrate panels. In addition, Example 4 showed improved wetting (low beading of liquid cleaner on surfaces) and cleaning of different substrates, namely metal, painted and unpainted, polymeric (e.g. plastic) acrylic and polycarbonate.

The Example 4 oil-in-water emulsion cleaning composition showed improved resistance to staining unpainted surfaces (Al 7075 Alclad and Titanium alloy TI 6Al-4V) when tested according to ASTM F458. Abrasion number testing according to AMS 1650A, section 3.2.9.1, results showed a weight loss less than 2 mg, less than half the permitted weight loss for passing.

Figure 3:
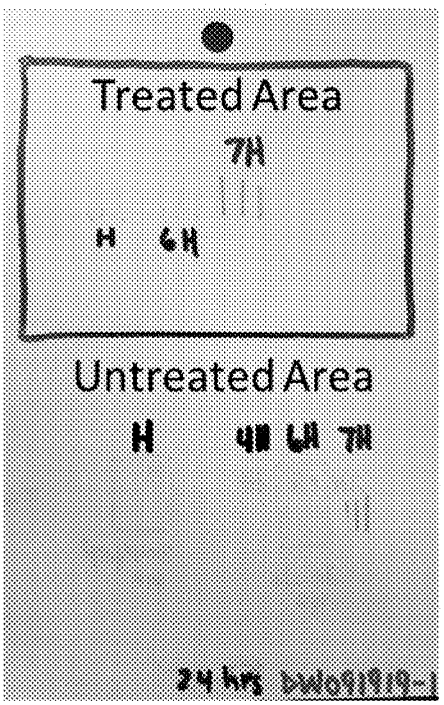
FIG. 3 is a photograph of a painted test panel having one section cleaned with an embodiment of the invention and one control section where no cleaner was applied.

As shown in Table 4 and FIG. 3, the Example 4 oil-in-water emulsion cleaning composition did not degrade, e.g. soften paint on a painted test panel surface more than 1 pencil hardness when tested according to ASTM F502-08. The test was carried out by treating one section of the painted test panel with the sample composition and leaving a second section of the panel untreated, as shown in FIG. 3, the treated paint on Panel 1 had the same 7H pencil hardness as the untreated paint.

TABLE 4

Effect of cleaner on painted surfaces

| | Hardness ASTM F502-08 | | |
|---|---|---|---|
| Panel | Untreated Area | Treated Area | Result |
| Panel 1 | 7 H | 7 H | Pass |
| Panel 2 | 6 H | 6 H | Pass |

The Example 4 composition was tested against lithium grease and heavy-duty grease purchased from Lucas Oil, machining lubricant from The Orelube Corporation, and engine lubricant from Hy-per Lube. It showed improved cleaning efficiency as analysed by gloss and haze value.

As FIG. 1 shows, gloss results were compared to a newly prepared, high gloss painted surface (control), the present composition has shown a gloss value of 85.6 which is close to control value of 88.7. In contrast, FIG. 1 shows that comparative products 1 and 2 have gloss values of 78.4 and 73.3, which was significantly less gloss.

Figure 2:
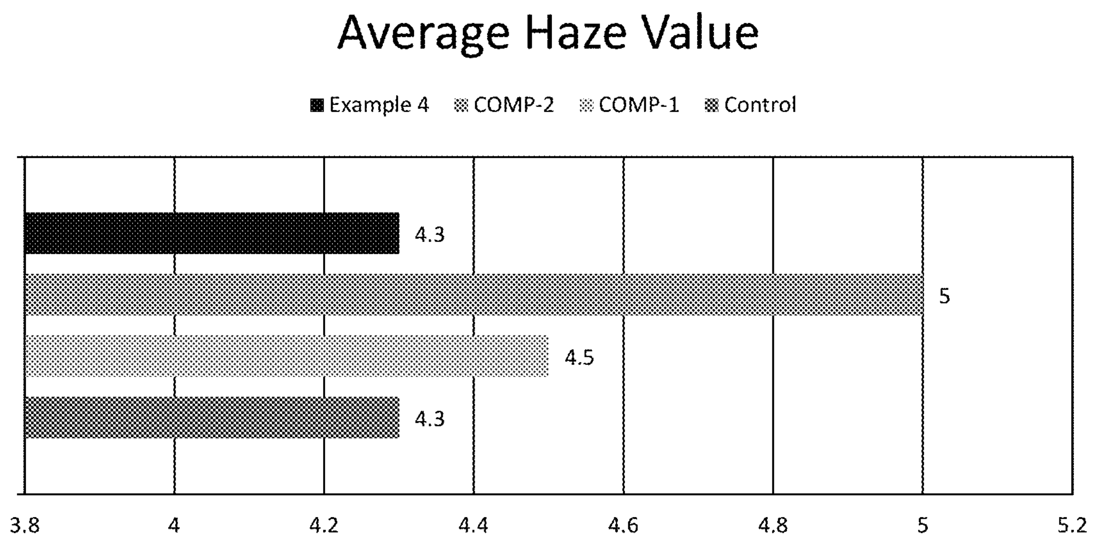
FIG. 2 is a graph comparing average haze value of freshly painted high gloss painted surfaces, which after painting were cleaned with an embodiment of the invention, or cleaned with comparative materials or were untreated; and haze value measured.

In addition, FIG. 2 shows that the Example 4 composition, has an equal haze value (4.3) to the control panel, while comparative products 1 and 2 showed higher haze value of 4.5 and 5 respectively indicating undesirable materials remaining on the hazier surfaces. From the result, we can conclude that the Example 4 composition has a better cleaning and paint maintenance than the comparative cleaners.

Immersion corrosion testing was carried out on different substrates as per ASTM F483, using the Example 4 composition. As shown in Table 5, Example 4 passed the test with only very minor weight loss.

TABLE 5

Immersion corrosion result for Example 4

| | Airbus ($mg/cm^2/24$ hrs.) | | AMS 1650 ($mg/cm^2/24$ hrs.) | |
|---|---|---|---|---|
| Substrate | Required | Result | Required | Result |
| Al 2024 Alclad | 0.02 | 0.01 | Not Required | |
| Al 7075 Alclad | 0.02 | 0.01 | 0.3 | 0.02 |
| Anodized Al 2024 Bare | 0.02 | 0.0 | Not Required | |
| Polished C1020 Steel, AMS-5046 | 0.8 | 0.0 | Not Required | |
| Cd Plated, 1020 steel, AMS-5046 | 0.3 | 0.0 | Not Required | |

Sandwich corrosion testing was carried out on different substrates using the Example 4 composition per ASTM F1110. As shown in Table 6, Example 4 passed the test and showed no pitting or discoloration and a rating of 1 per ASTM F1110.

TABLE 6

Sandwich corrosion result for Example 4.

| Substrate | AMS 1650 | Boeing | Airbus |
|---|---|---|---|
| Al 7075 Alclad | Pass | Pass | Pass |
| Al 7075 bare, Anodized | Pass | Pass | Pass |
| Al 2023 Alclad | Not required | Not required | Pass |

Example 5

In Example 5, the effect of particle size of the solid particles was assessed using aluminum silicate clay with a particle size of 900 nm. The emulsion was prepared as described in Example 4, in which the water and oil components are mixed followed by the addition of phosphonic acid corrosion inhibitor, anionic surfactant and the clay. Use of clay with larger particle size took a longer shear time to wet and uniformly disperse the clay particles. Example 5 showed an abrasion number close to 5 mg when tested according AMS 1650A, section 3.2.9.1. In Examples 2-4, a clay with a particle size of less than 300 nm was used, which provided very low degree of abrasion.

The present disclosure demonstrates a cleaning composition and a method of dry-washing a substrate and in particular for a dry-washing composition and process that requires no rinsing and leaves a residual corrosion and stain resistant shield on aerospace substrates. The dry-washing composition is localized to the actual area of cleaner application, with viscosity selected such that the cleaner does not run, e.g. drip or sag, onto or over untreated surfaces. The process is highly efficient in eliminating steps in restoring the appearance of large aerospace surfaces with a single cleaning and polishing step without the need for rinsing of the surface. The modified process is rapid and efficient and can be adapted to a wide range of painted and unpainted aircraft surfaces.

The foregoing disclosure has been described in accordance with the relevant legal standards, thus the description is exemplary rather than limiting in nature. Variations and modifications to the disclosed embodiment may become apparent to those skilled in the art and do come within the scope of the disclosure. Accordingly, the scope of legal protection afforded this disclosure can only be determined by studying the following claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

We claim:

1. A dry-wash cleaning composition that comprises an oil-in-water emulsion containing components, based on the weight of the composition:

A) water present in an amount of at least 50 wt. %;

B) isoparaffinic organic solvent;

C) ultra-fine solid particles having a median diameter (DM) of less than 900 nanometers;

D) an aqueous emulsion of wax-free glossing agent;

E) at least one surfactant, different from that found in component D), optionally comprising at least one anionic surfactant, and wherein the composition does not include a non-ionic surfactant;

F) polydialkylsiloxane oil; and

G) water-soluble or water-miscible corrosion and stain inhibitor.

2. The dry-wash cleaning composition of claim 1 further comprising one or more additives selected from emulsifier, pH adjuster; thickener, anti-static agents and preservatives.

3. The dry-wash cleaning composition of claim 2 wherein the emulsifier is present in an amount of 0.8 to 3 wt. %, based on the weight of the composition, and comprises at least one tall oil fatty acid.

4. The dry-wash cleaning composition of claim 3 wherein the pH adjuster is present in an amount of 1-3 wt. %, based on the weight of the composition, and comprises an alkanolamine.

5. The dry-wash cleaning composition of claim 4 wherein the thickener is present in an amount of about 0.1-1.0 wt. %, based on the weight of the composition, and comprises an anionic polysaccharide thickener.

6. The dry-wash cleaning composition of claim 1, wherein component C), the solid particles, comprises clay having a DM of less than 300 nm.

7. The dry-wash cleaning composition of claim 6, wherein component C), the solid particles, comprise aluminum silicate, present in an amount of 5-15 wt. %, based on the weight of the composition.

8. The dry-wash cleaning composition of claim 1, wherein component E), the at least one surfactant, different from that found in component D), comprises at least one anionic surfactant.

9. The dry-wash cleaning composition of claim 8, wherein the at least one anionic surfactant comprises one or more hydrophobic alkyl chains and a sulfur-containing charged hydrophilic end group.

10. The dry-wash cleaning composition of claim 8, wherein the at least one anionic surfactant comprises a diester sulfosuccinate salt present in an amount of 0.1-0.3 wt. %, based on the weight of the composition.

11. The dry-wash cleaning composition of claim 8, wherein the at least one anionic surfactant comprises a di-alkyl sulfosuccinate where the di-alkyl is selected from dibutyl, diisobutyl, dihexyl, dioctyl sulfosuccinate present in an amount of at least 0.01 and up to 0.5 wt. %, based on the weight of the composition.

12. The dry-wash cleaning composition of claim 1, wherein component G), the water-soluble or water-miscible corrosion and stain inhibitor, comprises an organophosphonic acid, organophosphinic acid or a combination thereof.

13. The dry-wash cleaning composition of claim 12, wherein component G), the water-soluble or water-miscible corrosion and stain inhibitor, comprises an organophosphonic acid comprising a C6-C18 organic portion and is present in an amount of at least 0.01 and up to 0.5 wt. %, based on the weight of the composition.

14. The dry-wash cleaning composition of claim 1, wherein

A) the water is present in an amount of 60-90 wt. %;

B) the isoparaffinic solvent is hydrotreated and present in an amount of 5-25 wt. %;

C) the ultra-fine solid particles comprise aluminum silicate clay having a DM of less than 300 nm present in an amount of 5-15 wt. %; and the composition further comprises an alkanolamine present in an amount of 1-3 wt. %, thickener present in an amount of 0.1-1.0 wt. %, and tall oil fatty acid emulsifier present in an amount of 1-3 wt. %; each based on the weight of the composition.

15. The dry-wash cleaning composition of claim 14 wherein:

E) the at least one surfactant, different from that found in component D), comprises an anionic surfactant selected from sulfosuccinate surfactants present in an amount of 0.1-0.3 wt. %;

F) the polydialkylsiloxane oil has a viscosity in a range of 100 to 1000 cSt and is present in an amount of 0.5-0.2 wt. %; and G) the water-soluble or water-miscible corrosion and stain inhibitor comprises a phosphonic acid present in an amount of 0.1-0.3 wt. %.

16. A method of cleaning and glossing aircraft exteriors comprising steps of:

a) applying a composition according to claim 1, to an aircraft exterior surface or portion of thereof comprising one or more of painted surfaces, unpainted metal surfaces, and polymeric surfaces;

b) wiping or rubbing the composition on the surface thereby emulsifying and/or removing dirt from at least one of said surfaces;

c) allowing the composition to dry on said surfaces to produce a cleaner residue comprising the dirt; and d) removing the cleaner residue and any dirt without water rinsing, optionally buffing the surface.

* * * * *